United States Patent [19]

Ferret Bofill et al.

[11] Patent Number: 4,570,759
[45] Date of Patent: Feb. 18, 1986

[54] DISC BRAKE WITH CALIPER HAVING RELEASABLY LOCKABLE REINFORCEMENTS

[75] Inventors: Joaquim Ferret Bofill, Barcelona; Josep Para Joan, Llissa de Munt, both of Spain

[73] Assignee: Bendiberica S.A., Barcelona, Spain

[21] Appl. No.: 564,067

[22] Filed: Dec. 21, 1983

[30] Foreign Application Priority Data

Dec. 27, 1982 [ES] Spain .................................. 519.068

[51] Int. Cl.⁴ .............................................. F16D 55/00
[52] U.S. Cl. ............................... 188/73.32; 188/73.47; 411/532; 411/539; 411/517; 403/370; 292/256.75
[58] Field of Search ...................... 188/72.5, 370, 71.1, 188/73.43, 73.44, 73.45, 73.46, 73.47, 73.39, 327, 79.5 GC, 73.32; 403/365, 370; 411/353, 517, 519, 518, 539, 540, 541, 546, 531, 532, 535, 536; 292/256.75

[56] References Cited

U.S. PATENT DOCUMENTS

| | | | |
|---|---|---|---|
| 922,120 | 5/1909 | Frazier | 292/256.75 |
| 1,435,433 | 11/1922 | Triggs | 411/532 |
| 3,337,007 | 8/1967 | Swift | 188/79.5 GC |
| 3,491,647 | 1/1970 | Frazier | 411/532 |
| 3,602,328 | 8/1971 | Fannin | 188/73.47 |
| 4,476,962 | 10/1984 | Bofill | 188/73.47 |

FOREIGN PATENT DOCUMENTS

| | | | |
|---|---|---|---|
| 0083881 | 7/1983 | European Pat. Off. | 188/73.45 |
| 2546641 | 4/1976 | Fed. Rep. of Germany | 403/370 |

*Primary Examiner*—Duane A. Reger
*Assistant Examiner*—Alvin Oberley
*Attorney, Agent, or Firm*—Ronald D. Welch; Ken C. Decker

[57] ABSTRACT

The caliper (52), in the form of a closed frame surrounding the fixed support (50), incorporates at least one axial reinforcing member (3) joining two axially separated zones (1, 2) of the caliper by passing through them and extending radially beyond the periphery of the disc (53). The reinforcing member incorporates a head (4), which is received within a complementary recess in the first zone of the caliper (1), and a threaded end cooperating with first and second locking and tightening elements, cooperating with each other (for example a locking nut 5 and a removable washer 10) of which the first elements is lockable on the threaded end so as to give, together with the second element, a predetermined tension to the reinforcing member, the second element being capable of being selectively disengaged to allow the reinforcing member to be separated (by tilting or longitudinal displacement) from the second zone (2) of the caliper.

6 Claims, 11 Drawing Figures

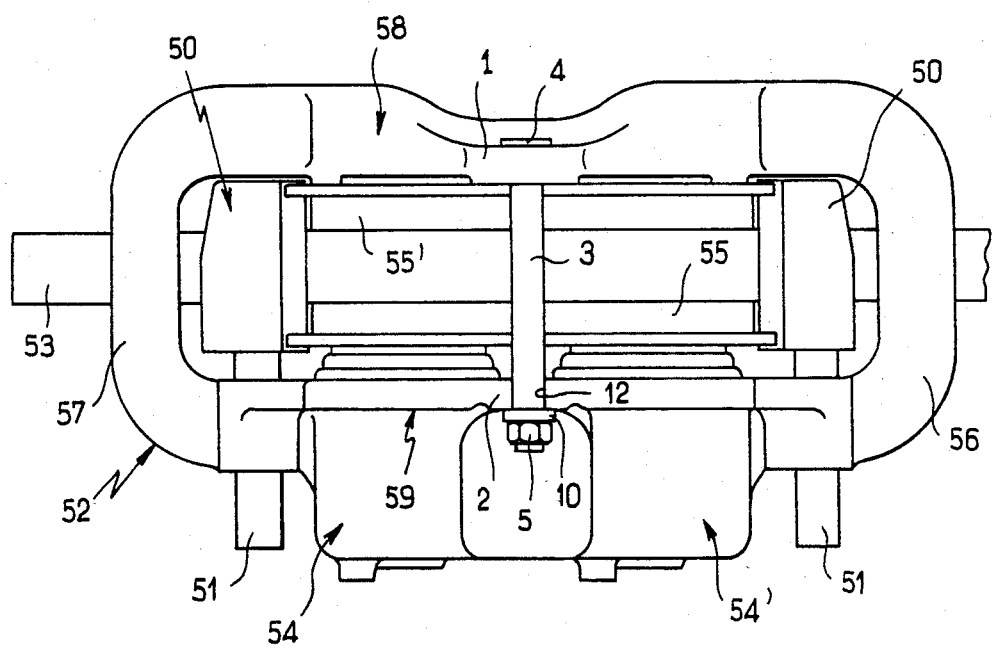
FIG_1

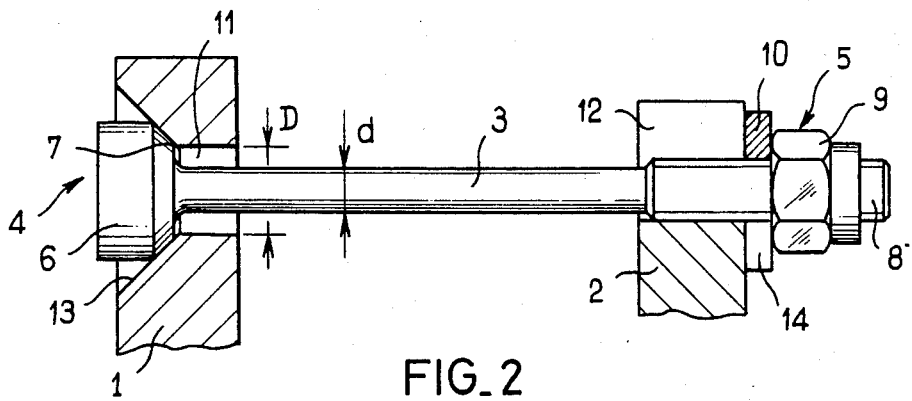
FIG_2
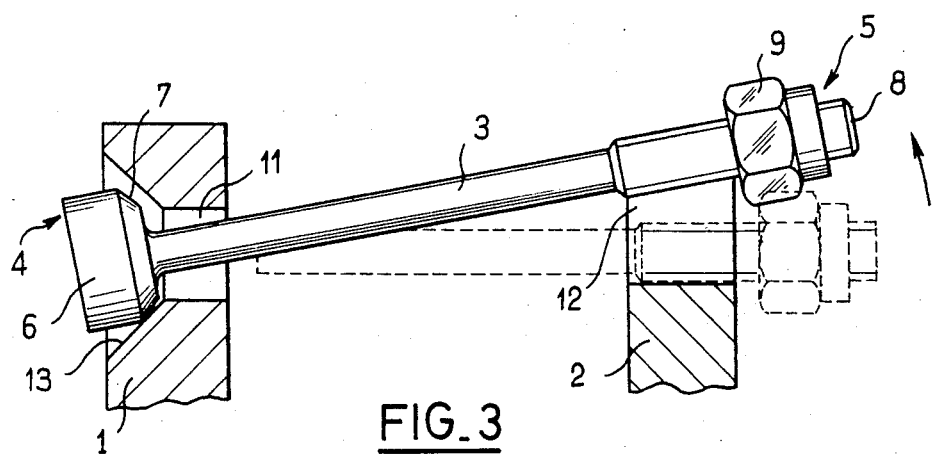
FIG_3
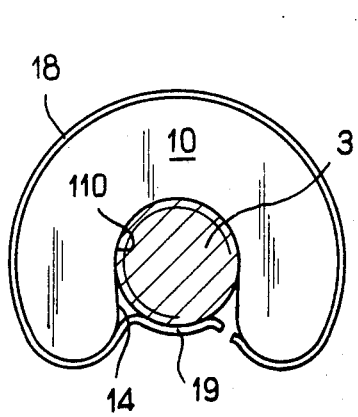
FIG_5
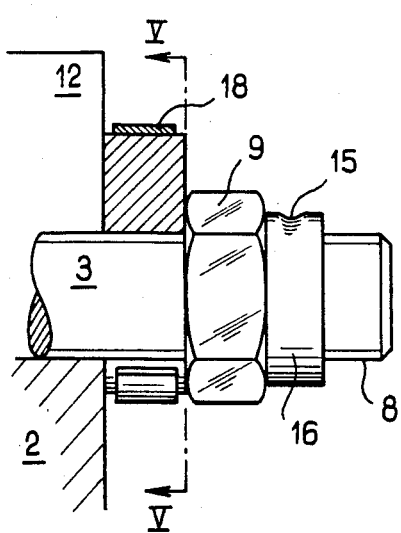
FIG_4

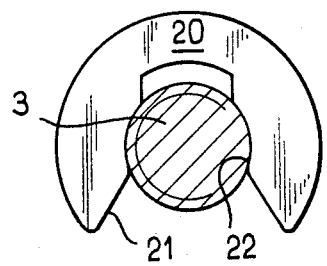
FIG_7
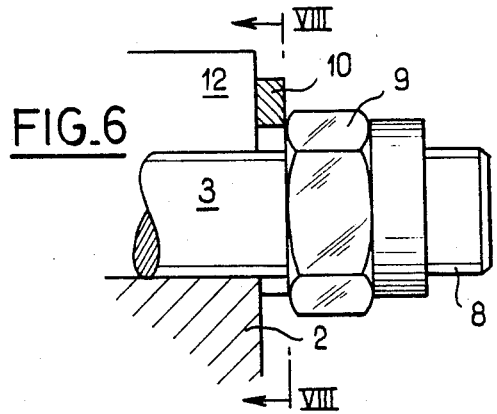
FIG_6
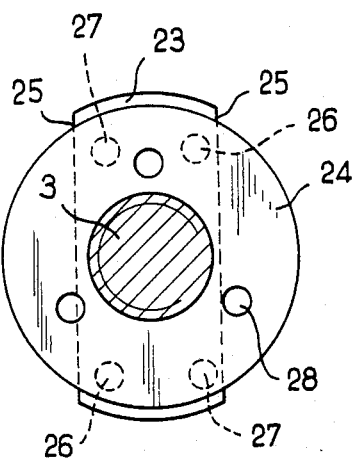
FIG_9
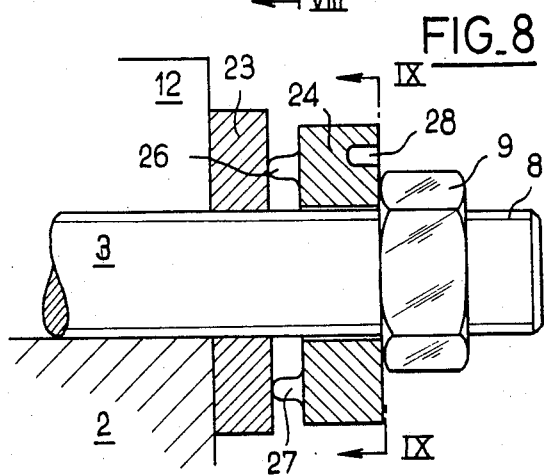
FIG_8
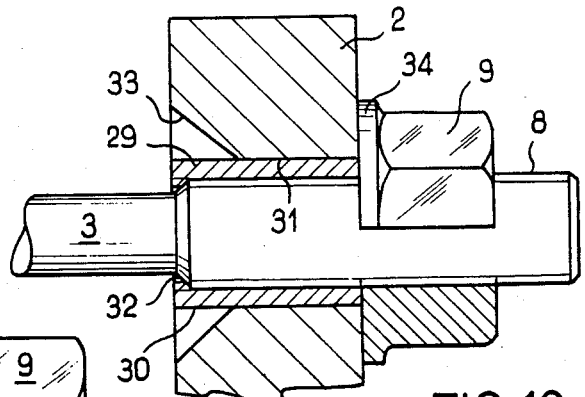
FIG_10
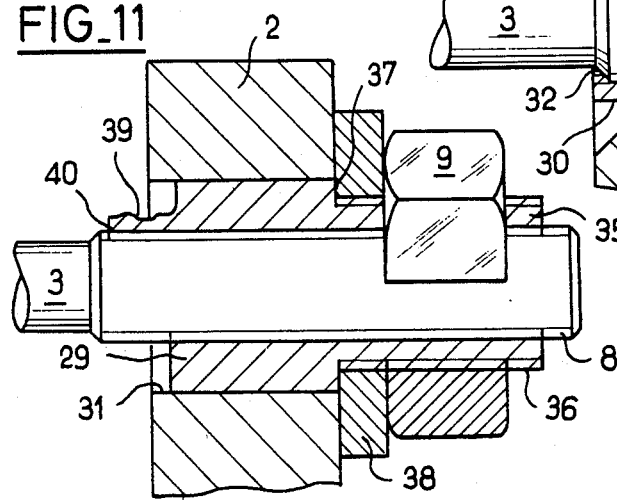
FIG_11

DISC BRAKE WITH CALIPER HAVING RELEASABLY LOCKABLE REINFORCEMENTS

The present invention concerns disc brakes, especially for motor vehicles, and more particularly a disc brake having a caliper slidingly mounted on a fixed support in which are housed, so as to be anchored and to slide, two friction components capable of coming into frictional engagement with the opposite surfaces of a disc during the operation of a brake actuator carried by the caliper, this caliper forming a frame positioned around the fixed support and incorporating at least one detachable axial tubular reinforcing member positioned radially beyond the periphery of the disc and joining first and second zones of the caliper, both sides of the disc in the axial sense.

A brake of this type is described in the document EP-No.A-0,083,881 in the name of the Applicant Company. In the said document, the tubular reinforcing members particularly take the general form of bolts passing through aligned holes in line in the first and second portions of the caliper, and provided at one end with a support head, and, at the other end, with a thread cooperating with a nut for locking and for tightening the bolts.

In such an arrangement, in order to replace the worn friction components or brake pads by friction components with new linings, it is necessary to dismantle the bolts by unscrewing the nuts, and after replacing the assembly, to retighten the bolts, which does not allow the correct factory tension adjustment to be guaranteed and results in substantial modification of the stresses in the caliper. Moreover, during these operations, the bolts and nuts may be damaged, or even lost.

An object of the present invention is to overcome these disadvantages by proposing a brake arrangement of the type defined above, of simple construction, the setting up of which is easy and rapid, eliminating the need to provide for special operations, after changing the friction components, in order to re-establish the initial mounting tension of the reinforcing components, and also limiting the risk of loss of the reinforcing components and their locking and tightening means.

To achieve this, according to a feature of the invention, the reinforcing member incorporates a headed end, cooperating in bearing engagement, with a corresponding surface of the first zone of the caliper, and an opposite threaded end cooperating with first and a second locking and tightening means, cooperating with each other, of which the first means is capable of being locked on the threaded end in a position giving, together with said second means, a known tension to the reinforcing component, said second means being capable of being selectively disengaged so as to allow the reinforcing member to be separated from the second zone of the caliper.

According to a more particular feature of the invention, the first locking and tightening means is a nut screwed and locked on the threaded end of the reinforcing member, the second locking and tightening means incorporating a washer means interposed between the nut and the second zone of the caliper.

According to another more particular feature of the invention, the first locking and tightening means consists of a tapped bush which is screwed and locked on the threaded end and which is received within the cylindrical opening of the second zone of the caliper, the second locking and tightening means consisting of a nut cooperating in abutment with a shoulder of the bush which is coplanar with an abutment surface of the second zone of the caliper.

The accompanying drawings illustrate diagrammatically, by way of examples which do not limit the scope of the present invention, different embodiments of the invention.

FIG. 1 is a plan view of a disc brake with a caliper having a removable reinforcement according to the invention;

FIG. 2 is a partial axial section which shows the mounting of a reinforcing bolt with a tightening device in the form of a U-shaped washer;

FIG. 3 is a view, similar to that in the preceding figure, in which the tightening device has been removed, showing the disengagement of the bolt by pivoting;

FIG. 4 is a partial axial section, on a larger scale, of the end nut shown in the preceding figures, provided with a tightening device in the form of a U-shaped washer with a safety leaf spring;

FIG. 5 is a transverse section along the line V—V shown in FIG. 4;

FIG. 6 is a view, similar to that shown in FIG. 4, in which the locking washer takes the form of an elastic clip;

FIG. 7 is a transverse section along the line VII—VII shown in FIG. 6;

FIG. 8 is a view similar to those shown in FIGS. 4 and 6, in which the tightening device is formed by two coaxial washers which constitute an axial cam device;

FIG. 9 is a transverse section of the view shown in FIG. 8 along the line IX—IX;

FIG. 10 is a view, similar to the preceding views, in which the tightening device consists of a ring capable of being locked on the bolt; and FIG. 11 is a similar illustration, showing a variant of the device shown in the preceding figure.

FIG. 1 shows a disc brake incorporating a fixed support 50 intended to be joined to a fixed portion of a vehicle (not shown), and supporting so as to allow sliding, by means of two axial pins 51 in the example shown, a movable caliper 52 straddling the brake disc 53 and incorporating at least one hydraulic brake actuator 54, 54' pushing directly a first friction component or brake pad 55, one of a pair of friction components 55, 55' mounted, so as to be anchored and to slide, on the fixed support 50.

The caliper 50 forms a frame or structure in the form of a closed non-planar framework positioned around the fixed support 50 and incorporating two lateral arms 56 and 57, straddling the disc, joined by an outer portion 58 of the caliper and an inner portion 59 of the caliper incorporating the brake acutator. Each of the outer and inner portions of the caliper incorporates at least one zone projecting radially outwards 1, 2, respectively, these two opposite zones being joined by one another by a tubular reinforcing member 3 extending axially, radially beyond the periphery of the disc 53 and above the friction components 55, 55'.

The two opposite longitudinal zones 1 and 2 of the caliper are shown in FIGS. 2 and 3. In this embodiment, the reinforcing member consists of a bolt in the form of a column 3 provided, at its ends, with a head and a locking means, designated by the general references 4 and 5, respectively.

The headed end 4 of the bolt 3 consists of a cylindrical head 6 whose surface facing the opposite end is provided with a conical chamfer 7, at 45° for example. The locking and tightening means at the end of the bolt here take the form of an assembly consisting of an end thread 8, machined on the corresponding end of the bolt, a nut 9 screwed in a proper manner on this thread, and a tightening device 10, described below, interposed between the opposite surfaces of the nut 9 and of the zone of the caliper 2.

As may be seen in the figures, the bolt 3 passes through the two zones 1 and 2 of the brake caliper via opposite aligned openings 11 and 12. The first of the latter, opposite the headed end 4, consists of a cylindrical hole of a diameter D, much greater than the diameter 7 of the bolt 3, and whose opening facing outwards relative to the brake, that is to say in a direction opposite to that of the caliper zone 2, is chamfered so as to form a conical seat 13, complementary to the conical chamfer 7 of the headed end 4. The opening 12 is provided, on the other hand, with a slot which opens radially outwards on the upper edge of the zone 2 of the caliper.

In the particular case of FIGS. 2 and 3, the tightening component 10 consists of a washer mounted on the thread 8 of the pillar 3 and whose central orifice 110 is extended radially by a lateral slot 14 which allows the thread to be disengaged laterally outwards.

During the assembly of the brake provided with the device described, after having placed in position the pad carriers supported by conventional components of the support 50, not shown, the bolt forming the columns 3 is placed in the position shown and the nut 9 is screwed onto the thread 8. Before it comes into contact with the zone 2 of the caliper, the slotted washer 10 is introduced between the nut and the corresponding surface of the caliper zone 2.

The nut 9 is then tightened with a torque wrench or any other similar tool, and the nut is finally locked on the thread 8, for example by means of a drop of hardening resin, not shown, or a blow from a center punch 15 applied to the collar 16 of the nut (FIG. 4), so as to produce a corresponding deformation on the interface between the nut and the thread.

From the time this is carried out, the pre-tension applied during assembly to the bolt forming the pillar is precisely determined and it is not possible to modify it without destroying the assembly of the bolt and nut.

To change the brake pads, the washer 10 is extracted with the aid of a suitable percussion tool which is applied from below in FIG. 2, as a result of which the untightened configuration is obtained, indicated by the dotted lines in FIG. 3. The space thus created between the nut 9 and the caliper arm 2 allows the pillar 3 to swing upwards, as indicated by the arrow, until the end nut assembly 5 leaves the top of the caliper zone 2; at this moment, the end nut assembly 5 may be displaced to the left until it comes into contact with the caliper zone 1, so that the upper opening of the caliper is clear to allow the worn pad carriers to pass upwards and to allow the new pad carriers to be placed in position.

The assembly of the new pads is in fact carried out by repeating the operations described above in the reverse order. The last phase is the force-fitting of the washer 10, typically by percussion, with the provision, if necessary, of entry chamfers on the adjacent edges of the nut 9 and/or the edges of the washer 10. Thus it is understood that on remounting the washer 10 in its installation position, the tightening pre-stress established in the factory during the assembly of the brake is re-established. This justifies the name of tightening device or component used in the description and in the claims, given that the required tightening tension is re-established after each reassembly.

This tightening component or washer 10 may have the half-moon configuration shown in the front view in FIG. 5. To prevent the accidental loss of this device due to operational vibrations, various devices may be provided.

In the case of FIGS. 4 and 5, the washer 10 is surrounded on its periphery by a leaf-spring 18 whose ends are fitted around the ends of the slotted washer, as may be seen in the figures. In addition, one of the ends of the spring, or both ends, is curved inwards so as to serve as an abutment 19 against the thread 8. This safety spring may be placed in position or removed by displacing it axially relative to the bolt 3.

In the variant of this device shown in FIGS. 6 and 7, the washer 20, similar to the washer 10 above, is made of spring steel and its lateral entry opening 21 incorporates opposite flanks 22, complementary to the diametrically opposed surfaces of the threaded portion 8 of the bolt 3, so that the washer is joined to the bolt by snap fitting when sufficient radial pressure is applied.

In the variant shown in FIGS. 8 and 9, the tightening device 10 consists of two washers, 23 and 24, freely mounted coaxially on the thread 8, between the nut 9 and the caliper zone 2 in the same way as for the washer 10 previously described. The first washer 23 incorporates two laterally opposed flats 25, and the second washer 24 incorporates, on its surface facing towards the first washer, two pairs of axially extending lugs 26 and 27. As may be seen in the figures, this position is such that the lugs can come to bear axially on the outward face of the flatted washer 23, so that the assembly of the two washers 23, 24 occupies a known axial length corresponding to the value necessary to apply the tightening pressure, or can be disengaged from this washer in the flats 25, by relative rotation about the axis of the washers, in order to create the necessary play for dismantling. Indeed, any other axial cam device producing the desired effect may be used in accordance with the invention. The actuation of the washer 24 can be achieved, for example, by means of a suitable pin wrench which is entered into holes 28 formed in the surface of the washer 24 opposite the lugs 26, 27. Although the nut 9 shown here is not provided with a collar, obviously it may also be locked to the bolt 3 by any one of the methods described above.

FIG. 10 describes another embodiment of a tightening device, here consisting of a sleeve 29 incorporating an internal thread, joined in the manner shown to the thread 8 of the bolt 3, and an external cylindrical surface 30 which is fitted in a closed cylindrical hole 31 in the caliper zone 2, which, in this case, replaces the open slotted opening 12 of the preceding embodiments. In this case, mounting is carried out by fully tightening the nut 9, until the required preliminary adjustment tension is obtained, driving the sleeve 29 along the thread. When the required tension is reached, the sleeve 29 is locked in the position thus reached, for example by means of a drop of hardening resin 32 or by a blow with a center punch similar to that previously described. As this operation must be carried out on the inside surface of the arm 2 of the caliper, the latter advantageously incorporates a widened part 33 so that the sleeve need not intrude into the space occupied by the pad carriers. Dismantling is carried out by unscrewing the nut 9 and displacing axially the bolt 3 until the sleeve 29 comes into abutment against the opposite zone 1 of the caliper. During reassembly, the bolt is replaced and the nut 9 is again fully tightened against the sleeve 29, so as to re-establish the correct preliminary tension established in the factory. In this case, the nut 9 can be of any current construction, preferably with a collar 34 forming a proper bearing surface, well centered, against the end of the sleeve 29 and the outer surface of the caliper arm 2.

In the variant shown in FIG. 11, the sleeve 29 differs from that described above in that it projects outwards, relative to the caliper 2, as a peg 35, which is threaded externally at its end 36 to accept the nut 9 and which defines an intermediate step 37 corresponding functionally to the abutment at the right hand end of the sleeve shown in FIG. 10. Its function is the same as that already described. Instead of the collar 34 of the nut, a ground washer 38 may be used, and instead of locking with a drop of resin 32, a center punch blow 39 may be applied on a small protuberance 40 projecting axially relative to the inner end of the sleeve, as may be seen in the half-section view of the upper portion in FIG. 11.

Although the invention has been described in relation to a single axial reinforcing member, it should be understood applying equally to a brake whose caliper is provided with two or more axial reinforcements, as described in the document EP-NO-A-0,083,881 mentioned above.

We claim:

1. A disc brake comprising a caliper slidingly mounted on a fixed support and carrying a brake actuator operable to bring two friction elements into frictional engagement with the opposite surfaces of a disc rotatable around an axis, the caliper forming a frame positioned around the fixed support and including first and second portions on both sides, axially, of said disc, and at least one tubular reinforcing member straddling said disc and said friction elements and releasably interconnecting under a predetermined tension said first and second portions of said caliper, said reinforcing member extending, in operative position, through a first opening in said first portion and through a second opening in said second portion, said reinforcing member having a headed end cooperating in bearing engagement with a corresponding surface of said first portion into which opens axially said first opening in the form of an axially extending through bore of dimension greater than that of said reinforcing member and smaller than said headed end, and, opposite said headed end, a threaded end portion protruding outwardly axially from said second opening and onto which is screwed and locked in a determined position a tightening nut, said second opening being in the form of an open slot opening axially, in the direction opposite to said first opening, into a flat bearing surface of said second portion, a radially releasable spacer means of determined thickness interposed between said bearing surface of said second portion and said nut, said first opening having a transverse dimension greater than the transverse dimension of a connection zone of said tubular reinforcing member with said headed end so as to permit said threaded end with its locked nut to be disengaged from said slot by pivoting when said spacer means is removed.

2. A disc brake comprising a caliper slidingly mounted on a fixed support and carrying a brake actuator operable to bring two friction elements into frictional engagement with the opposite surfaces of a disc rotatable around an axis, the caliper forming a frame positioned around the fixed support and including first and second portions on both sides, axially, of said disc, and at least one tubular reinforcing member straddling said disc and said friction elements and releasably interconnecting under a predetermined tension said first and second portions of said caliper, said reinforcing member extending, in operative position through a first opening in said first portion and through a second opening in said second portion, said reinforcing member having a headed end cooperating in bearing engagement with a corresponding surface of said first portion into which opens axially said first opening in the form of an axially extending through bore of dimension greater than that of said reinforcing member and smaller than said headed end, and, opposite said headed end, a threaded end portion protruding outwardly axially from said second opening and onto which is screwed and locked in a determined position a tightening nut, said second opening being in the form of an open slot opening axially, in the direction opposite to said first opening, into a flat bearing surface of said second portion, a two-part spacer means interposed between said bearing surface of said second portion and said nut, said two parts of said spacer means being rigid and displaceable one relative to the other between two positions wherein said two-part spacer means have two different overall axial thickness, said first opening having a transverse dimension greater than the transverse dimension of a connection zone of said tubular reinforcing member with said headed end so as to permit said threaded end with its locked nut to be disengaged from said slot by pivoting when said two-part spacer means is brought to its position of reduced axial thickness.

3. The disc brake of claim 1 or of claim 2, wherein said headed end is formed, adjacent said connection zone, with a substantially conical surface, said corresponding surface of said first portion of said caliper being a widened outer portion of complementary shape of said first opening.

4. A disc brake comprising a caliper slidingly mounted on a fixed support and carrying a brake actuator operable to bring two friction elements into frictional engagement with the opposite surfaces of a disc rotatable around an axis, the caliper forming a frame positioned around the fixed support and including first and second portions on both sides, axially, of said disc, and at least one tubular reinforcing member straddling said disc and said friction elements and releasably interconnecting under a predetermined tension said first and second portions of said caliper, said reinforcing member extending, in operative position through a first opening in said first portion and through a second opening in said second portion, said reinforcing member having a headed end cooperating in bearing engagement with a corresponding surface of said first portion into which opens said first opening in the form of an axially extending through bore, and, opposite said headed end, a threaded end portion protruding outwardly axially from said second opening and onto which is screwed and locked in a determined position a tapped bush received within said second opening and having a shoulder coplanar, in said determined position, with a flat bearing surface of said second portion of said caliper into which opens axially said second opening in the form of a through bore, and a tightening nut releasably mounted on said reinforcing member to abut directly or indirectly with said flat bearing surface and said shoulder.

5. The disc brake of claim 4, wherein said shoulder is formed by one end of said tapped bush, said tightening nut being screwed onto said threaded end of said reinforcing member.

6. The disc brake of claim 4, wherein said tapped bush comprises an externally threaded portion of reduced outer diameter extending axially beyond said shoulder, said tightening nut being screwed onto said threaded portion of said bush.

* * * * *